Figure 1:
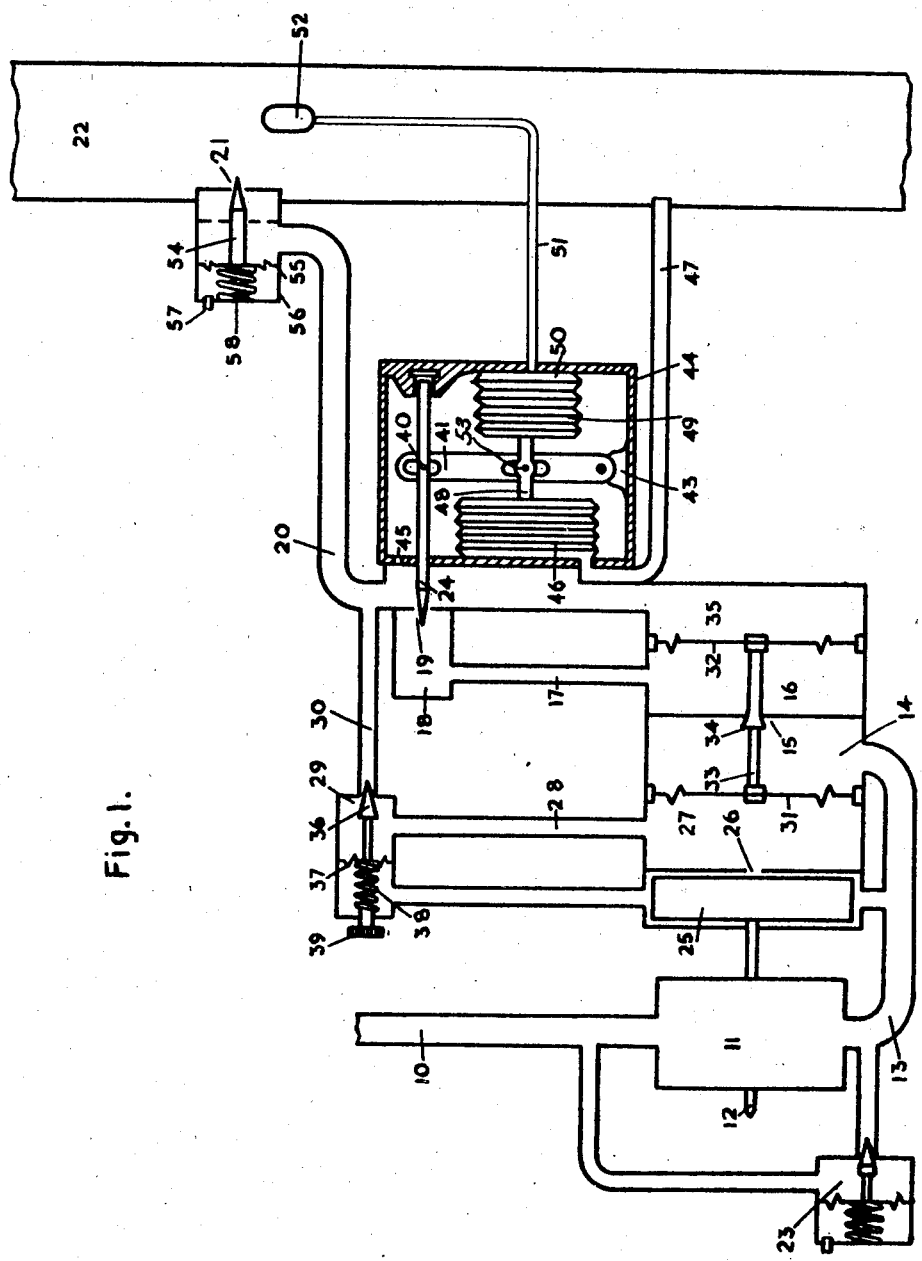

April 27, 1948. G. J. ARMSTRONG 2,440,241
FUEL SUPPLY SYSTEM FOR INTERNAL-COMBUSTION ENGINES
Filed Feb. 27, 1945 3 Sheets-Sheet 1

Inventor
George Jeffrey Armstrong
BY Loyd Hall Sutton
Attorney

April 27, 1948.　　　G. J. ARMSTRONG　　　2,440,241
FUEL SUPPLY SYSTEM FOR INTERNAL-COMBUSTION ENGINES
Filed Feb. 27, 1945　　　3 Sheets-Sheet 2

Inventor
George Jeffrey Armstrong
By Loyd Hall Sutton
Attorney

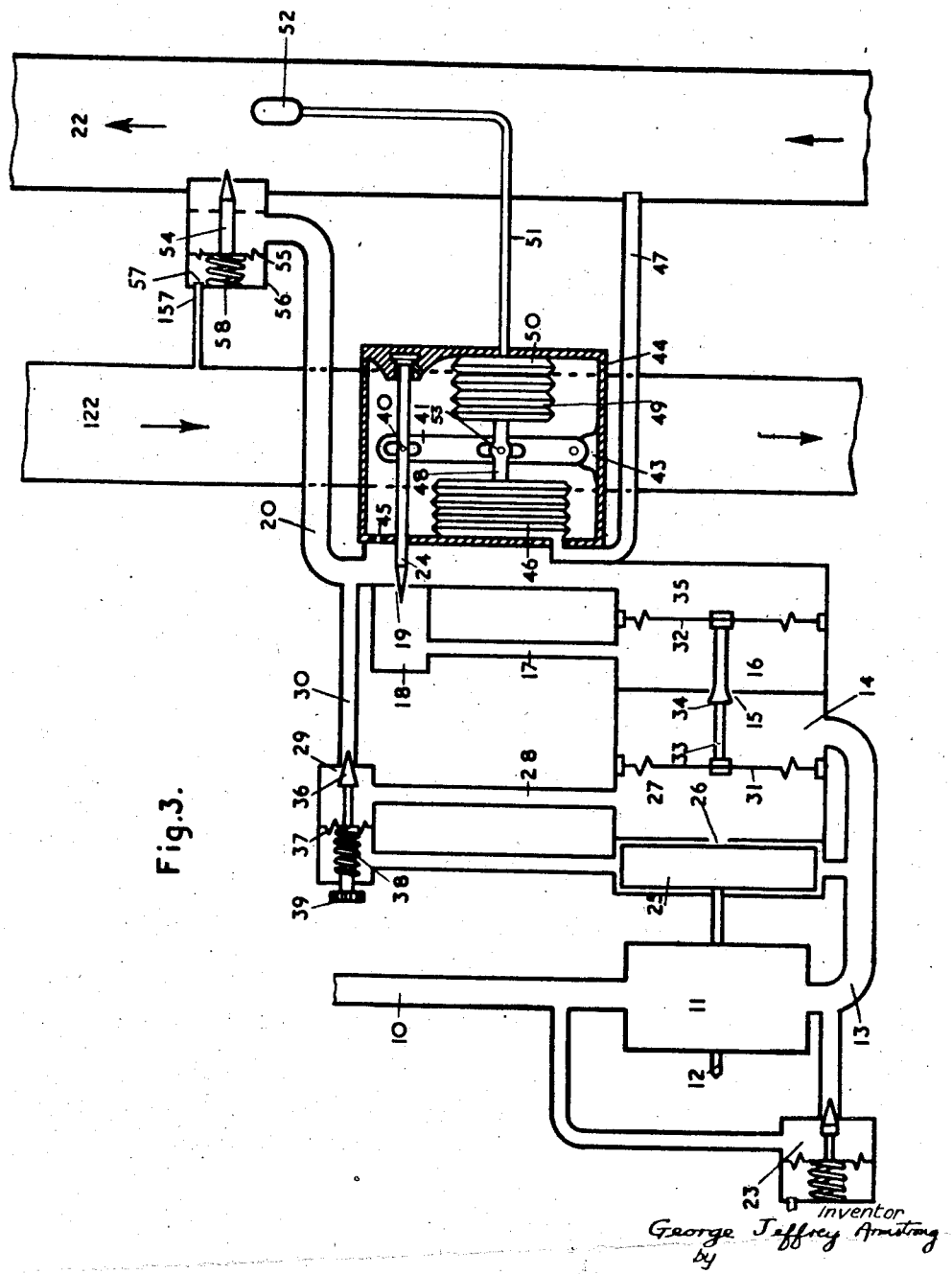

Patented Apr. 27, 1948

2,440,241

UNITED STATES PATENT OFFICE 2,440,241

FUEL SUPPLY SYSTEM FOR INTERNAL-COMBUSTION ENGINES

George Jeffrey Armstrong, Farnborough, England

Application February 27, 1945, Serial No. 580,028
In Great Britain June 9, 1943

Section 1, Public Law 690, August 8, 1946
Patent expires June 9, 1963

6 Claims. (Cl. 123—119)

The invention relates to fuel supply systems for reciprocating internal combustion engines in which fuel is injected under pressure into an intake along which air passes to the engine and in which the rate at which the fuel is supplied is related to the mass air consumption of the engine, i. e. to the rate of air supply measured in units of mass per unit time.

It is known that the mass air consumption of an engine and hence its fuel requirements are a function of the rotational speed of the engine crankshaft, of the absolute pressure and of the temperature of the gas passing through the intake manifold and of the absolute exhaust back pressure and a constant value of the ratio of fuel to air may be obtained by a fuel metering device which uses the approximate relationship $$f = K'N\left[\left(P - \frac{P'}{C}\right) - k(T - T')\right]$$

where $f$ is the rate of supply of the fuel, $K'$, $C$, $k$ and $T'$ are suitable constants, $P$ and $T$ are respectively the absolute pressure and temperature of the gas passing along the intake manifold, $P'$ is the exhaust back pressure and $N$ is the rate of rotation of the engine crankshaft.

In practice in most engines with a well designed exhaust system the exhaust back pressure varies with atmospheric pressure and hence the atmospheric pressure value may be substituted for exhaust back pressure in the above expressions.

It is an object of the invention to provide a convenient arrangement whereby the effective flow area of a metering valve in a fuel supply system for an internal combustion engine is adjusted in accordance with changes in the absolute pressure in the intake manifold and in the atmospheric pressure or the exhaust back pressure.

This may be done in accordance with the invention by coupling the valve to two resilient bellows, one evacuated and the other subjected internally to the pressure in the induction manifold, immersed in a liquid maintained at a predetermined pressure above atmospheric or exhaust back pressure and presenting different external areas to the pressure of said liquid. Means may conveniently be provided for maintaining the pressure of the fuel immediately prior to injection at a pre-determined value above atmospheric or exhaust back pressure, and the bellows be immersed in said fuel.

Figure 2:
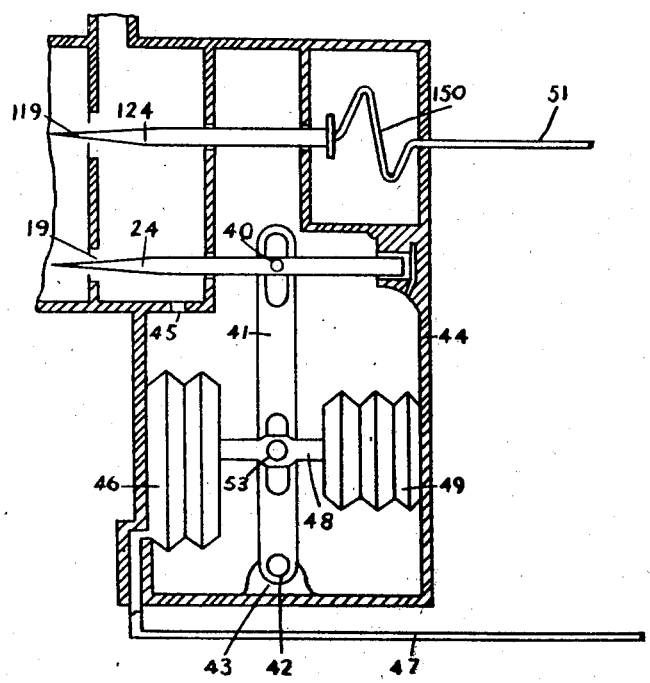

The invention is illustrated in the accompanying drawings in which Fig. 1 is a sectional elevation of a fuel supply system embodying the invention, Fig. 2 is a fragmentary section showing an alternative construction, and Fig. 3 is a sectional elevation similar to Fig. 1 showing another modification of the invention.

Referring to Fig. 1 fuel entering through passage 10 passes into a positive displacement pump 11 which is driven from the engine through shaft 12 and which it leaves through passage 13 and passes to the engine through chamber 14, pressure regulating valve 15, chamber 16, passage 17, chamber 18, metering orifice 19, passage 20 and discharge nozzle 21 through which it is discharged into the engine intake manifold 22. The output of the positive displacement pump 11 is arranged to exceed the maximum fuel requirements of the engine at any operating speed and to dispose of the excess output of the positive displacement pump a relief valve 23 is provided. The effective area of the metering orifice 19 is adjusted by a tapered needle 24 whose position is controlled by means to be described subsequently to give an effective area representing a function of the pressure in the intake manifold 22 and of the atmosphere pressure, such means forming the subject matter of the invention.

Driven by the same shaft 12 as the positive displacement pump 11 is a centrifugal pump 25 in which the pressure at its periphery is the same as the pressure in the passage 13, which is regulated to a predetermined value by the relief valve 23, and which generates a pressure difference such that the pressure at the eye is always less than the pressure at the periphery and in the passage 13. Because it is so arranged that the pressure drop between the passages 13 and 20 is at all times greater than the pressure difference generated by the centrifugal pump 25, liquid passes through the centrifugal pump from the periphery towards the eye where an outlet 26 into a chamber 27 is provided, liquid from the chamber 27 passing therefrom to passage 28, valve 29, passage 30 and through passage 20 and discharge nozzle 21 into the intake manifold. Dividing the chamber 27 from the chamber 14 is a flexible diaphragm 31 to which is attached a second diaphragm 32 by a rod 33 carrying a tapered plug 34, movement of which adjusts the effective area of the pressure regulating valve 15. The diaphragm 32 is subject on the one side to the pressure in chamber 16, i. e. upstream of the metering orifice 19, and on the other side to the pressure in a chamber 35 connected to pipe 20, i. e. downstream of the metering orifice 19. Consequently, the effective area of the pressure regulating valve 15 will be adjusted by movement of the tapered plug 34 until equilibrium is set up between the pressure differences acting in opposition across the two diaphragms 31, 32 which will be set up when the pressure difference across the metering orifice 19 is equal to the pressure difference generated by the centrifugal pump 33. By varying the relative areas of the diaphragms 31, 32, the proportionality between these pressure differences may be varied as desired. Since the pressure difference generated by a centrifugal pump is proportional to the square of the speed at which it is driven, the pressure drop across the metering orifice 19 will consequently be maintained proportional to the square of the engine speed, and the flow through the metering valve 19 will therefore, for a given adjustment of the metering valve, be proportional to the engine speed.

The valve 29 forming the slow running device comprises a tapered plug 36 secured to a flexible diaphragm 37. The right hand side of the diaphragm 37 is acted upon by the pressure existing at the eye of the centrifugal pump 25, while the left hand side is acted upon by the pressure at the periphery of the centrifugal pump. Secured to the left hand side of the diaphragm is a tension spring 38 whose anchorage is adjustable by a knurled nut 39. Consequently the tension spring tends to hold the plug 36 away from its seating, to open the valve 29 while as the engine speed rises the plug 36 is pressed towards its seating. The plug 36 is arranged to allow leakage when pressed on its seating so that a small flow through the valve 29 takes place under all operating conditions, thus maintaining a slow flow through the centrifugal pump 25.

The means for regulating the pressure drop across the metering orifice 19 and the slow running arrangement which have just been described do not form part of the subject of the present invention and have been described by way of example only. The means so far described form the subject of co-spending British applications Nos. 13190/44 and 13191/44 (U. S. Serial No. 580,030).

The means for locating the needle 24 to adjust the metering orifice 19, which means form the subject of the present invention will now be described in detail.

The needle 24 is pivoted at 40 to a lever 41 the other end of which is pivoted at 42 to a bracket 43 on the wall of a casing 44 the interior of which is filled with fluid from the pipe 20 through a port 45. Located within the casing 44 is a bellows 46 the interior of which communicates through a tube 47 with the interior of the intake manifold 22. Attached to the bellows 46 by a link 48 is a second bellows 49 which is evacuated internally and which is secured to the wall of the casing 44 through the intermediary of a temperature-responsive capsule 50 to which is connected a tube 51 to the other end of which is attached a thermometer bulb 52 located within the intake manifold 22. The lever 41 is pivotally connected to the link 48 at 53.

The discharge nozzle 21 is variably obstructed by a tapering needle 54 the rear end of which is secured to a diaphragm 55 in a chamber 56 having a vent 57 open to the atmosphere the diaphragm 55 being backed by a compression spring 58. It will be seen that the pressure of the fuel in the pipe 20 acts on the right hand side of the diaphragm 55 while the left hand side of the diaphragm 55 is acted upon by atmospheric pressure and by a force due to the spring 58. The diaphragm 55 will accordingly be displaced to open or close the nozzle 21 so as to maintain the fuel pressure in the pipe 20 at a pressure exceeding the instantaneous atmospheric pressure by an amount depending on the strength of the spring 58. Any change in the atmospheric pressure will accordingly be accompanied by a corresponding change in the pressure of fuel in the pipe 20 and hence inside the casing 44.

The bellows 46 and 49 are of different sizes so that they present different effective areas to the pressure of fuel acting on their outsides. Accordingly any change of pressure in the fuel in the pipe 20 consequent upon a change in atmospheric pressure will act differentially upon the bellows 46, 49 and will cause a movement of the two bellows and the connecting link 48 hence moving the lever 41 and needle 24. Similar movements will be cause by variation of the temperature in the induction manifold 22 owing to the fact that the bellows 49 are secured to a temperature sensitive capsule 50 while any change in the pressure within the intake manifold 22 will also cause movement of the needle 24 since such pressure change will be transmitted through pipe 47 to the inside of capsule 46. Accordingly the position of the needle 24 and hence the effective area of the metering orifice 19 will be regulated to represent a function of the absolute pressure in the intake manifold and of the absolute atmospheric pressure and of the temperature in the intake manifold.

Referring to Fig. 2 the arrangement illustrated therein differs from that shown in Fig. 1 in that the bellows 49 is directly attached to the wall of the chamber 44, and in the provision of a separate metering orifice 119, variably obstructed by a tapering needle 124 positioned by a Bourdon tube or the like temperature-sensitive element 150, which is connected as in Fig. 1, by a tube 51 filled with thermometric fluid to a bulb in the intake manifold (not shown). Otherwise the construction and operation are similar to those shown and described with reference to Fig. 1.

If the design of the exhaust system or the presence of exhaust-driven accessories such as an exhaust-driven turbosupercharger renders it no longer possible to assume that the exhaust back pressure is always approximately equal to the atmospheric pressure, it may be necessary to measure the exhaust back pressure directly instead of indirectly through the atmospheric pressure. Fig. 3 shows an arrangement in which this is effected. Referring to Fig. 3, the system comprises, in addition to the elements shown in Fig. 1, a connection 157 between the port 57 and an exhaust pipe, part of which is shown at 122, so that the pressure within the chamber 44 is maintained at a value exceeding the exhaust back pressure in the pipe 122 by a predetermined quantity.

I claim:

1. In a fuel supply system for injecting fuel into an internal combustion engine intake the provision of means for adjusting a metering valve to represent a function of the absolute pressure in the intake and of a pressure equivalent to the exhaust back pressure, said means comprising two connected resilient bellows of different size connected to said valve, one of said bellows being evacuated internally, and the other subjected internally to the pressure in the intake and both being immersed in a liquid whose pressure is maintained at a value exceeding said other pressure by a predetermined quantity.

2. A fuel supply system for an internal combustion engine in which fuel injected under pressure into the engine intake passes through a metering orifice of variable effective area with means for maintaining the effective area of the metering orifice proportional to a desired function of the absolute pressure in the intake and to a pressure equivalent to the exhaust back pressure, said means comprising a pair of resilient bellows, one evacuated and the other subject internally to the pressure in the intake, immersed in a liquid maintained at a predetermined pressure above said other pressure and presenting different external areas to the pressure of said liquid.

3. A fuel supply system for injecting fuel into an internal combustion engine intake, including a pump for delivering fuel, an adjustable metering valve in the path of said fuel, means for regulating the pressure drop across the metering valve, two connected resilient bellows immersed in fuel and presenting different external areas to the pressure of said fuel, and a connection between said bellows and the valve, means being provided for rendering said bellows responsive to changes in the absolute pressure in the intake and in a pressure equivalent to the exhaust back pressure, said intake manifold pressure acting for this purpose inside one of said bellows and said other pressure acting externally on both bellows through the fuel in which they are immersed.

4. A fuel supply system for injecting fuel into an internal combustion engine intake, comprising a pump for supplying fuel, a metering orifice in the path of said fuel, means for regulating the pressure drop across said metering orifice, means for adjusting the area of said metering orifice in accordance with changes in the absolute pressure in the intake and in a pressure equivalent to the exhaust back pressure, said means comprising connected resilient bellows, a chamber surrounding said bellows and filled with fuel, said bellows presenting different external areas to the external pressure of the fuel, one of said bellows being evacuated, means for applying intake pressure to the interior of the other bellows and means for causing the pressure of the fuel in the chamber to vary in accordance with changes in the value of said other pressure.

5. A fuel supply system for injecting fuel into an internal combustion engine intake comprising a pump for supplying fuel to an injection nozzle located in the engine intake, a metering orifice between said pump and nozzle, means for regulating the pressure drop across said metering orifice, means for maintaining the pressure of fuel between the metering orifice and nozzle at a value exceeding a pressure equivalent to the exhaust back pressure by a predetermined quantity, a chamber connected to said fuel supply between said metering orifice and nozzle, a needle mounted to be slidable in said orifice to adjust its area, two bellows connected to the needle, one of said bellows being evacuated internally and the other connected to the intake, the bellows presenting different external areas to the surrounding fuel, whereby the needle is moved to vary the effective area of the metering orifice in response to changes of exhaust back pressure and in the pressure in the intake manifold.

6. A fuel system as claimed in claim 2 and having means for varying the fuel supply in accordance with temperature changes in the intake.

GEORGE JEFFREY ARMSTRONG.

REFERENCES CITED

The following references are of record in the file of this patent:

UNITED STATES PATENTS

| Number | Name | Date |
|---|---|---|
| 2,224,472 | Chandler | Dec. 10, 1940 |
| 2,250,932 | Kittler | July 29, 1941 |
| 2,303,998 | Holley, Jr. | Dec. 1, 1942 |
| 2,341,257 | Wunsch | Feb. 8, 1944 |
| 2,348,008 | Hunt | May 2, 1944 |
| 2,374,844 | Stokes | May 1, 1945 |

FOREIGN PATENTS

| Number | Country | Date |
|---|---|---|
| 429,682 | Great Britain | June 4, 1935 |
| 523,895 | Great Britain | July 25, 1940 |